June 22, 1943. A. C. MARSHALL 2,322,583
CLAMP OR COUPLING FOR CONNECTING SCAFFOLD POLES
OR OTHER SOLID OR HOLLOW ELONGATED BODIES
Filed March 10, 1942 2 Sheets-Sheet 1

INVENTOR
Arnold Clarence Marshall
BY
Mock & Blum
ATTORNEYS

June 22, 1943.  A. C. MARSHALL  2,322,583
CLAMP OR COUPLING FOR CONNECTING SCAFFOLD POLES
OR OTHER SOLID OR HOLLOW ELONGATED BODIES
Filed March 10, 1942   2 Sheets-Sheet 2

INVENTOR
Arnold Clarence Marshall
BY
ATTORNEYS

Patented June 22, 1943

2,322,583

UNITED STATES PATENT OFFICE 2,322,583

CLAMP OR COUPLING FOR CONNECTING SCAFFOLD POLES OR OTHER SOLID OR HOLLOW ELONGATED BODIES

Arnold Clarence Marshall, Thornton Heath, England

Application March 10, 1942, Serial No. 434,056
In Great Britain March 13, 1941

7 Claims. (Cl. 24—81)

This invention relates to an improved coupling for connecting scaffold poles or other solid or hollow elongated bodies, and it refers to couplings of the type in which the poles or other bodies when connected lie at an angle to each other.

The present invention has for its object to provide a coupling for the purpose stated in which the necessity for drilled holes for effecting the pivotal connection of the movable gripping elements or caps of said coupling is dispensed with. By this means, not only is the construction of the coupling as a whole greatly simplified, but the necessity for any work upon the castings or stampings as the case may be is dispensed with. Moreover, the possibility of any part rusting is reduced to a minimum.

In order that the invention may be the better understood, reference is made to the accompanying drawings in which.

Referring to the accompanying drawings, 1 indicates the body of the clamp or coupling having upon opposite faces thereof recesses 2 and 3, each of said recesses being of semicircular outline designed to engage and partly surround a scaffold pole. The recess upon one face of the body is disposed at a right angle to the recess upon the other face of the body 1.

Figure 5:
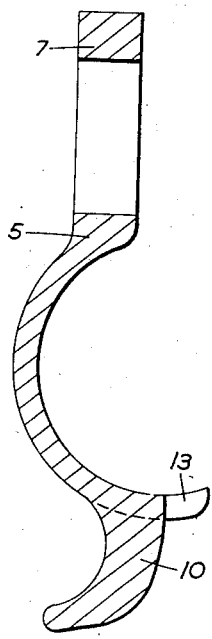
Fig. 5 is a longitudinal section of one of the cap or clamping members.
Figure 6:
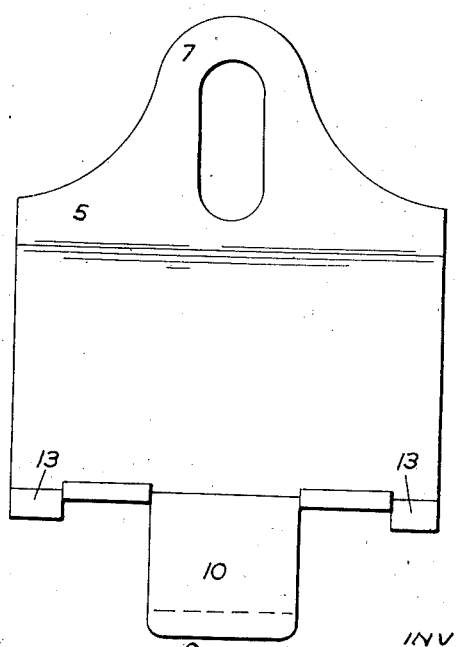
Fig. 6 is a view of the inner face of one of the cap members.

A clamping or cap member indicated by 5 is provided for each of the recesses 2 and 3, each of said cap members being provided at its free end with a lug or projection 7 slotted for the passage of a bolt 8, having a nut 8a and for the reception of which bolt a projection 9 is formed upon the body 1 which projection is provided with a slot open at its outer end. The shape of the cap is more clearly shown in Figs. 5 and 6, on reference to which it will be seen that the cap is provided at its inner end with a tongue or projection 10, which is curved as shown and which tongue as will be presently more fully explained, forms the means whereby the cap 5 is hingedly connected to the body. 11 and 11a indicate projections forming part of the body 1 of the clamp and arranged one upon one side of the recess 2 and the other upon one side of the recess 3, as more clearly shown in Fig. 4. The respective projections just referred to are perforated at 12 and 12a for the free passage of a tongue 10 which after being passed through a perforation is further bent, as shown more clearly in Fig. 3 to prevent the withdrawal of the said tongue from the perforation so that the disconnection of the cap from the body 1 is prevented. 13 indicates extensions provided upon the cap and arranged one upon each side of the tongue 10, which extensions form guides for closing the cap and assist in maintaining said cap in a closed position before the bolt 8 is screwed down to secure the cap in its effective position. The tongue 10 thus forms a pivot or hinge for the cap which may be readily swung into the open or closed position, the tongue when the cap is in the open position, engaging the inner wall of the perforation 11 or 11a as the case may be, so as to support the cap in a position such that it may be used as a temporary support for the pole preparatory to securing said pole in its final position. The fact that said tongue 10 is curved as described permits a sliding connection between the cap and the body of the clamp so that said cap may adjust itself to the pole in such a manner that there is a substantially continuous line of contact at all times around the pole.

Figure 2:
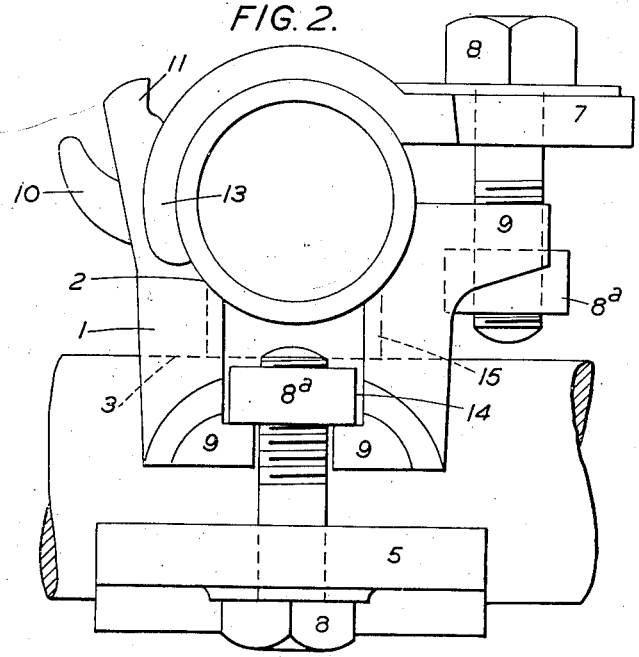
Fig. 2 is a view of the coupling as seen when looking in the direction of the arrow *a* Fig. 1.
Figure 3:
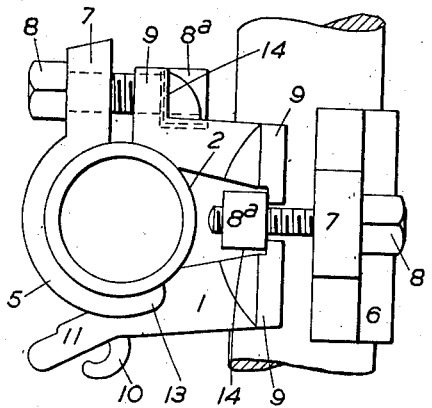
Fig. 3 is a side view of the coupling.
Figure 4:
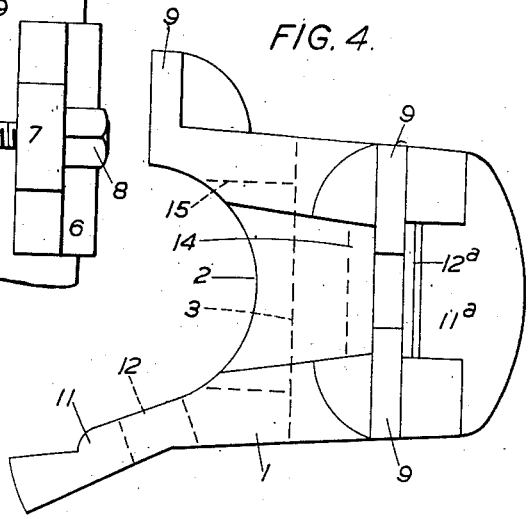
Fig. 4 is a side view of the body of the coupling.

Provision is made for holding the nut 8a upon the bolt 8 against rotation when the bolt is being tightened, such provision comprising as shown in Figs. 2, 3, and 4, a recess or cavity 14 formed partly in the body 1 of the clamp and partly in the inner face of the projection 9.

Instead of using a bolt having a square nut, a T head bolt could be used, the head engaging a suitably shaped recess formed in the back of the projection 9 which would be slotted to receive the stem of the bolt. The nut in this case would be on the outer end of the bolt, the outer face of projection 9 being curved to act as a guide for the head of the bolt into position behind the said projection.

Figure 1:
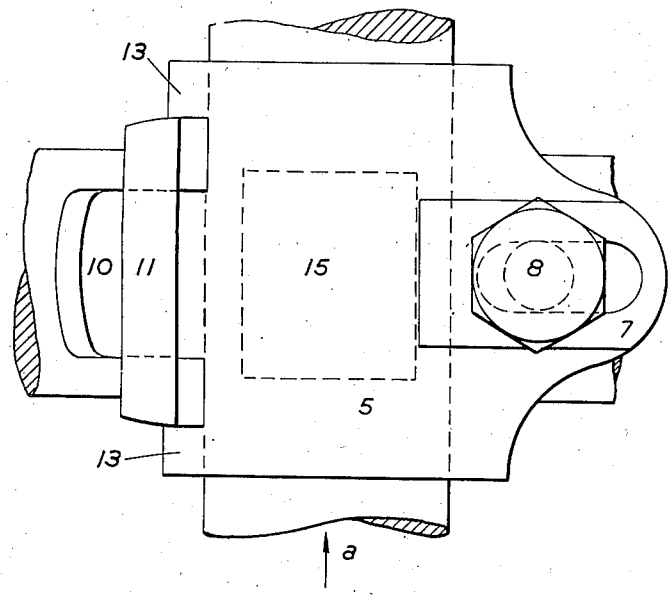
Fig. 1 is a plan view of a clamp or coupling according to the present invention as designed for use with scaffold poles.

In order to reduce the weight of the body 1 it may be provided with an opening as indicated by the dotted lines 15 in Figs. 1, 2, and 4.

By forming the body of the clamp in two parts and pivotally connecting them in any suitable manner such as to permit their angular adjustment with respect to each other, the device may be used as a swivel coupler permitting the angular relation between the two bodies gripped to be varied as may be desired. Suitable provision may be made for securing the parts in their adjusted positions.

I claim:

1. A clamp for connecting scaffold poles or other elongated bodies comprising a body, a pole engaging recess upon one face of the body, a pole engaging recess upon the opposite face of said body, said second recess being disposed upon a line at a right angle to the line of said first recess, a clamping member or cap for each of said recesses, a bolt and a nut for each clamping member, whereby each of said clamping members may be tightened upon a pole, a curved tongue upon each of said clamping members, means upon the body of the clamp to engage the respective projections and thereby hingedly connect the clamping member to the body of the clamp, in such a manner that there is a sliding connection between the cap and the body of the clamp so that said cap may adjust itself to the pole in such a manner that there is a substantially continuous line of contact at all times all around the pole.

2. A clamp for connecting scaffold poles or other elongated bodies comprising a body, a pole engaging recess upon one face of the body, a pole engaging recess upon the opposite face of said body, said second recess being disposed upon a line at a right angle to the line of said first recess, a clamping member or cap for each of said recesses, a bolt and a nut for each clamping member whereby each of said clamping members may be tightened upon a pole, a curved tongue upon each of said clamping members, openings in the body of the clamp to engage the respective tongues and thereby hingedly connect the clamping member to the body of the clamp in such a manner that there is a sliding connection between the cap and the body of the clamp so that said cap may adjust itself to the pole in such a manner that there is a substantially continuous line of contact at all times all around the pole, and at the same time, support the cap in a position such that said cap may serve as a temporary support for the body to be gripped.

3. A clamp for connecting scaffold poles or other elongated bodies comprising a body, a pole engaging recess upon one face of said body, a pole engaging recess upon the other face of said body, said second recess being disposed upon a line at a right angle to the line of said first recess, a clamping member for each of said recesses, a recess in each of said members for engaging a pole, a curved tongue at the inner end of each clamping member, a perforation at the outer end of each member, a bolt engaging the perforation, a projection upon the body of the clamp, an open ended slot in said projection for the passage of the bolt, projections upon the body of the clamp, a perforation in each projection, each designed to engage a curved tongue at the inner end of each clamping member and to thereby hingedly connect the clamping member to the body of the clamp, in such a manner that there is a sliding connection between the cap and the body of the clamp so that said cap may adjust itself to the pole in such a manner that there is a substantially continuous line of contact at all times all around the pole.

4. A clamp for connecting scaffold poles or other elongated bodies comprising a body, a pole engaging recess upon one face of said body, a pole engaging recess upon the other face of said body, said second recess being disposed upon a line at a right angle to the line of said first recess, a clamping member for each of said recesses, a recess in each of said members for engaging a pole, a lug at the inner end of each clamping member, a perforation at the outer end of each member, a bolt engaging the perforation, a projection upon the body of the clamp an open ended slot in said projection for the passage of the bolt, projections upon the body of the clamp, a perforation in each projection each designed to engage a curved tongue at the inner end of each clamping member and to thereby hingedly connect the clamping member to the body of the clamp in such a manner that there is a sliding connection between the cap and the body of the clamp so that said cap may adjust itself to the pole in such a manner that there is a substantially continuous line of contact at all times all around the pole, and extensions arranged one upon each side of the projection upon each clamping member, said extensions being adapted to serve as guides to facilitate the closing of the clamp and assist in maintaining the clamping member in a closed position before the bolt is screwed home to secure said clamping member in its closed position.

5. A clamp according to claim 1, in which the body portion is formed in two parts having means for pivotally connecting said parts in a manner such that the angular relation of the bodies gripped may be varied as desired.

6. A clamp for connecting scaffold poles or other elongated bodies comprising a body part formed in two parts, means pivotally connecting said parts, a pole engaging recess upon the outer face of one part, a pole engaging recess upon the outer face of the other part, a clamping member for each recess, a recess in each of said members for engaging a pole, a curved tongue at the inner end of each clamping member, a perforation at the outer end of each member, a bolt engaging the perforation, a projection upon the body of the clamp, an open ended slot in said projection for the passage of the bolt, projections upon the body of the clamp, a perforation in each projection each designed to engage a curved tongue at the inner end of each clamping member and to thereby hingedly connect the clamping member to the body of the clamp, in such a manner that there is a sliding connection between the cap and the body of the clamp so that said cap may adjust itself to the pole in such a manner that there is a substantially continuous line of contact at all times all around the pole.

7. A clamp for connecting scaffold poles or other elongated bodies comprising a body part formed in two parts, means pivotally connecting said parts, a pole engaging recess upon the outer face of one part, a pole engaging recess upon the outer face of the other part, a clamping member for each recess, a recess in each of said members for engaging a pole, a curved tongue at the inner end of each clamping member, a perforation at the outer end of each member, a bolt engaging the perforation, a projection upon the body of the clamp, an open ended slot in said projection for the passage of the bolt, projections upon the body of the clamp, a perforation in each projection each designed to engage a curved tongue at the inner end of each clamping member, and to thereby hingedly connect the clamping member to the body of the clamp in such a manner that there is a sliding connection between the cap and the body of the clamp so that said cap may adjust itself to the pole in such a manner that there is a substantially continuous line of contact at all times all around the pole, and extensions arranged one upon each side of the projection upon each clamping member, said extensions being adapted to serve as guides to facilitate the closing of the clamp and assist in maintaining the clamping member in a closed position before the bolt is screwed home, to secure said clamping member in its closed position.

ARNOLD CLARENCE MARSHALL.